W. R. TURNBULL.
AEROPLANE AND HYDROPLANE.
APPLICATION FILED APR. 2, 1906.

934,771.

Patented Sept. 21, 1909.
2 SHEETS—SHEET 1.

Witnesses:
John Lotch
Samuel C. Pearce

Inventor
Wallace Rupert Turnbull
By Dyer & Dyer
Attorneys.

W. R. TURNBULL.
AEROPLANE AND HYDROPLANE.
APPLICATION FILED APR. 2, 1906.
934,771.
Patented Sept. 21, 1909.
2 SHEETS—SHEET 2.
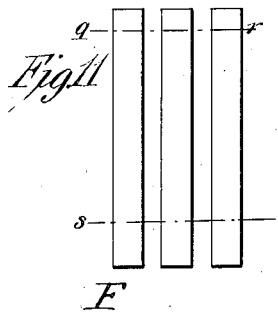
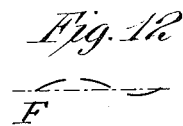
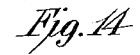
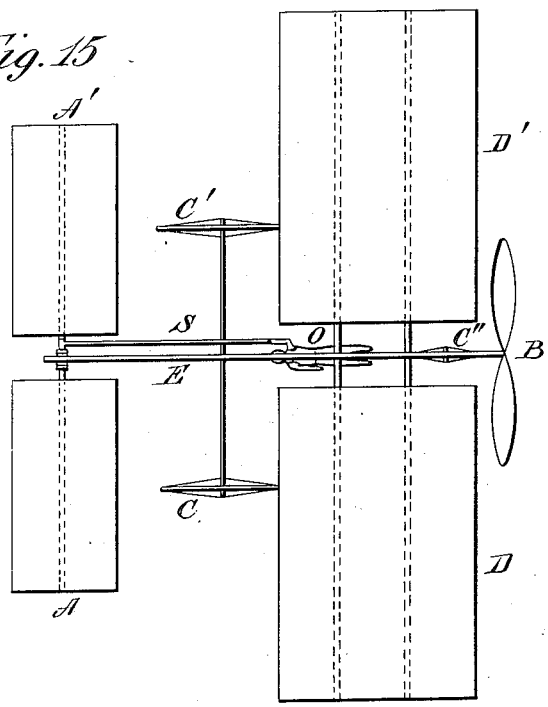
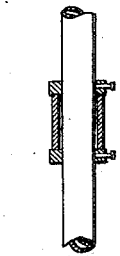
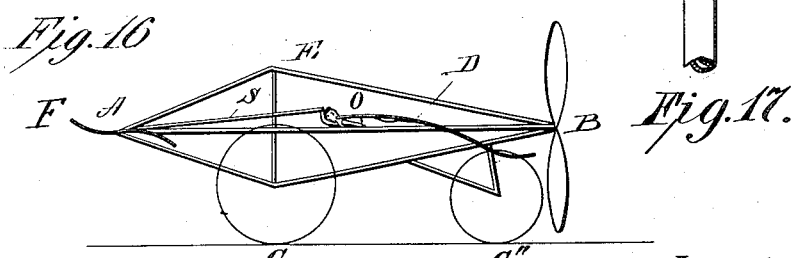
Witnesses:
Inventor
Wallace Rupert Turnbull
By his Attorneys.

UNITED STATES PATENT OFFICE.

WALLACE RUPERT TURNBULL, OF ROTHESAY, NEW BRUNSWICK, CANADA.

AEROPLANE AND HYDROPLANE.

934,771.

Specification of Letters Patent. Patented Sept. 21, 1909.

Application filed April 2, 1906. Serial No. 309,249.

*To all whom it may concern:*

Be it known that I, WALLACE RUPERT TURNBULL, a citizen of the Dominion of Canada, and a resident of Rothesay, in the county of Kings and Province of New Brunswick, have invented certain new and useful Improvements in Aeroplanes and Hydroplanes, of which the following is a specification.

Figures 1, 2, 3 and 4 represent some plan views of aeroplanes or hydroplanes which may be used for a flying-machine or water sustained machine, and Figs. 5, 6, 7, 8, 9, and 10 represent the cross-sections which these aeroplanes or hydroplanes may have along any lines; $a, b; c, d; e, f; g, h;$ etc., of Figs. 1, 2, 3 or 4; or along "fore and aft" lines of any other forms. Fig. 11 represents a plan view of a modification, and Figs. 12, 13 and 14 represent various cross sections along the "fore and aft" lines $q—r$, or $s—t$ of Fig. 11; Fig. 15 is a plan diagrammatical view of one embodiment of my invention; Fig. 16 is a side diagrammatical view; and Fig. 17 is a detail. In each case the forward edge of the aeroplane or hydroplane is indicated by the character F. Fig. 5 represents the general type of a cross-section of an aeroplane, having a surface of double curvature, viz., on the under forward portion a concave curvature, and on the under after portion a convex curvature.

The objects of using this form of aeroplane of double curvature is to obtain automatic longitudinal stability for the aeroplane and for the flying-machine or "aerodrome" to which it is attached. This automatic stability is realized because, with an aeroplane having a double curvature as described above, the center of pressure advances as the angle which the aeroplane makes with the air current passing it decreases, and the center of pressure retreats as the angle which the aeroplane makes with the air current passing it increases.

The further objects of using this form of aeroplane are that the lifting properties of this aeroplane are very good, while the "drift", or head resistance, is small compared with the "drift" of the usual type of single curvature aeroplane.

All of these facts have been demonstrated to me during a series of extended experiments.

I claim the right of using any proportions I may see fit or of using one or more minor curvatures, before or behind the two main curvatures as shown in Figs. 8, 9, and 10; or of using several aeroplanes of zero, single, or double curvature to produce the same or similar effect as the single aeroplane of double curvature (see Figs. 11, 12, 13 and 14).

Figure 6:
Fig. 6 represents the general type of a cross-section of an aeroplane having a cross-section of double curvature, viz., on the under forward portion a convex curvature and on the under after portion a concave curvature.
Figure 7:
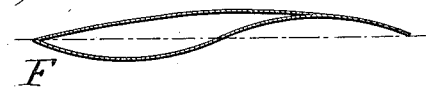
Fig. 7 represents the general type of a cross-section of an aeroplane having on the under forward portion a convex curvature, on the under after portion a concave curvature and on the upper side a convex curvature.

The object of using aeroplanes of the forms shown in Figs. 6 and 7 is to obtain automatic longitudinal stability for the flying machine to the forward portion of which it is attached, by reason of the lifting properties of these aeroplanes being comparatively greater, at small angles with the passing air-current than the lifting properties of other curved or plane surfaces at the same angles.

While the action of aeroplanes represented in cross-section by Figs. 6 and 7 is similar while they are placed at positive angles with the line of flight; the "negative lift" or depressing action, of one aeroplane (Fig. 7) is comparatively less when these aeroplanes are placed at negative angles with the line of flight, which may or may not be an advantage, according to the arrangement of all the aeroplanes attached to the machine.

Figure 8:
Figure 9:
Figure 10:

Figs. 8, 9 and 10 represent variations which the type represented by Fig. 5 may have; the object of using them being that the minor curvatures introduced may increase the "lift" or decrease the "drift", while the aeroplane, as a whole, maintains the property of automatic stability existing in the type represented by Fig. 5 as already explained in connection with that figure. While in Figs. 8, 9 and 10 I show sections of aeroplanes having triple and quadruple curvatures, I do not confine myself to this number of curvatures, but claim as my invention aeroplanes having any number of curvatures, that shall exhibit the same or similar characteristics of automatic stability as the type represented in cross-section by Fig. 5 and as already explained in connection with Fig. 5.

Fig. 11 represents the plan views and Figs. 12, 13 and 14 the various cross-sections along the "fore and aft" lines $q, r; s, t;$ etc. (Fig. 11) of several (in the case shown, three) aeroplanes placed behind one another; each aeroplane having a single curvature, but the combination of aeroplanes will be the equivalent, or partially the equivalent, of the single aeroplanes above described in reference to Figs. 1 to 10 inclusive. The plan view in these cases, as in those first considered, may have any form whatever, and may be composed of any number of aeroplanes having zero, double, or single curvature placed at any distance from one another.

While I claim the right of using the aeroplanes just described in Figs. 5, 6 and 7; 8, 9, and 10; 12, 13 and 14; in any position whatever (movable or fixed, superimposed, "staggered" or one behind the other) in a flying-machine or aerodrome, with or without the use of other aeroplanes, the *modus operandi* of a single combination of these aeroplanes is described as follows:

A pair of aeroplanes of the type shown in cross-section by Fig. 6 being mounted in the forward portion of a flying-machine or "aerodrome", and a pair of aeroplanes, of the type shown in cross-section by Fig. 5, being mounted in the central or after portion of the machine, the action is as follows: If the forward portion of the machine tips downward the comparative lift of the forward aeroplane (type of Fig. 6) becomes greater and at the same time the center of air-pressure on the after aeroplane (type of Fig. 5) moves forward; both of which actions tend to lift the forward portion of the machine and automatically restore equilibrium. Again, if the forward portion of the machine tips upward the comparative lift of the forward aeroplanes (type of Fig. 6) becomes less and at the same time the center of air-pressure on the after aeroplane (type of Fig. 5) moves aft; both of which actions tend to lift the after portion of the machine and automatically restore equilibrium. By making the forward aeroplanes movable about their long axes, the whole machine may be elevated or depressed while retaining its automatic stability just described. In this way steady horizontal or oblique flight is automatically obtained, and the whole machine elevated or depressed at will. An arrangement of this kind is shown in Fig. 15 (plan view) and Fig. 16 (side elevation) in which A, A' are the forward aeroplanes (type of Fig. 6) moved by the operator, O, by means of the lever S; the support for the aeroplanes containing a bearing, as shown in Fig. 17.

Figure 1:
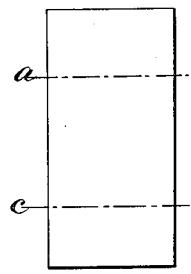
Figure 2:
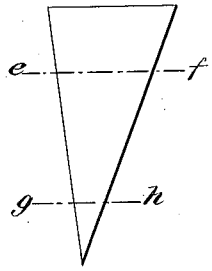
Figure 3:
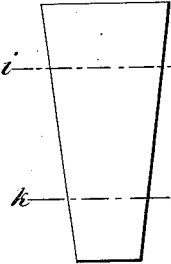
Figure 4:
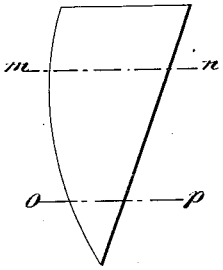
Figure 5:

D, D' are two other aeroplanes (type of Fig. 5). The propelling mechanism is indicated by the propeller B and a frame with the wheels it rolls upon are indicated by E and C, C', C'' respectively.

While I show this single combination of aeroplanes of two of the types described in the first part of this specification, it must be understood that I claim the right of using any of the aeroplanes described in this specification in any position whatever in a flying-machine or aerodrome, and the right also of using one or more movable steering aeroplanes, of any form whatever, placed in the forward portion of any flying-machine, soaring-machine, or "aerodrome" using aeroplanes of any type whatever.

Any or all of the types of aeroplanes described in this specification may be used to advantage as hydroplanes which are surfaces, of plane or curved form, attached to the hulls or frame-work of boats in such a manner that the hydroplanes are either wholly immersed in water all the time or rise to the surface of the water and "skim" or travel along the surface of the water when a propelling mechanism drives the boat forward; the object in either case being that the hull proper is wholly or partially lifted from the water, thus causing the displacement and head resistance to become much lessened. Planes of the type (represented in cross section in Fig. 5) and the modifications of that type described in this specification, are particularly well adapted for use as hydroplanes for the following reasons: If they are used wholly submerged at all times, they have the same advantage of automatic longitudinal stability, when the boat is in forward motion, already explained in connection with Fig. 5, and if they are used so that they rise to the surface of the water when the boat to which they are attached is propelled forward, they have the advantages of being very efficient lifters while offering very small head resistance or drift, and the convex after portion of planes of this type allows them to glide very easily over the surface.

I desire it understood that the planes described and illustrated have the desired shape when in operation, irrespective of what shape they may have when not in operation. It is therefore apparent that the planes may be flexible and of quite different shape when not in operation, but may be so constructed that they will assume the desired shape when they are in operation.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

Having now described my invention, what I claim as new and desire to secure by Letters Patent, is:

1. A device which moves through a sustaining medium, and which is supported therein by means of planes having at least one of the planes on the under side of a concave curvature in the forward portion, and a convex curvature in the after portion, and on the upper side a convex curvature in the forward portion, and a concave curvature in the after portion in combination with propelling means independent of the planes.

2. A device which moves through a sustaining medium and which is supported therein by means of planes, having a body, one at least of the planes having on the under side a concave curvature in the forward portion and a convex curvature in the after portion, and on the upper side a convex curvature in the forward portion and a concave curvature in the after portion, said planes being immovable in respect to the body.

3. A device which moves through a sustaining medium, and which is supported therein by means of planes, the combination with a sustaining plane, of a steering plane in the forward part thereof, the said steering plane having a double curvature on the under side, convex in the forward portion and concave in the after portion, and the sustaining plane having a double curvature on the under side, concave in the forward portion and convex in the after portion.

This specification signed and witnessed this twenty-seventh day of March, 1906.

WALLACE RUPERT TURNBULL. [L. S.]

Witnesses:
  F. P. STARR,
  C. W. ADAMS.